(12) United States Patent
Klinge et al.

(10) Patent No.: US 11,958,148 B2
(45) Date of Patent: Apr. 16, 2024

(54) JOINING HEAD FOR FASTENING A FASTENING ELEMENT TO THE SURFACE OF A COMPONENT

(71) Applicant: Eckold GmbH & Co. KG, St. Andreasberg (DE)

(72) Inventors: Markus Klinge, Andreasberg (DE); Martin Schneider, Bad Lauterberg (DE); Jens Borchers, Bad Lauterberg (DE); Sebastian Hoppe, Bad Sachsa (DE)

(73) Assignee: Eckold GmbH & Co. KG, St. Andreasberg (DE)

( * ) Notice: Subject to any disclaimer, the term of this patent is extended or adjusted under 35 U.S.C. 154(b) by 155 days.

(21) Appl. No.: 17/873,620

(22) Filed: Jul. 26, 2022

(65) Prior Publication Data

US 2023/0042240 A1 Feb. 9, 2023

(30) Foreign Application Priority Data

Aug. 6, 2021 (DE) .................... 10 2021 120 555.7

(51) Int. Cl.
*B23P 19/06* (2006.01)
*B23P 19/00* (2006.01)
*B25J 11/00* (2006.01)

(52) U.S. Cl.
CPC .......... *B23P 19/062* (2013.01); *B23P 19/006* (2013.01); *B25J 11/007* (2013.01)

(58) Field of Classification Search
CPC ..... B23P 19/001; B23P 19/006; B23P 19/007; B23P 19/062–064; B21J 15/10; B21J 15/025; B21J 15/32; B25J 11/007
See application file for complete search history.

(56) References Cited

U.S. PATENT DOCUMENTS

| 2011/0132520 A1 | 6/2011 | Druke |
| 2014/0020814 A1 | 1/2014 | Druke et al. |
| 2016/0354872 A1* | 12/2016 | Koscielski ......... B23K 11/0053 |
| 2017/0001236 A1 | 1/2017 | Badent |

FOREIGN PATENT DOCUMENTS

| DE | 102011009259 | 7/2012 |
| DE | 102017107923 | 10/2017 |
| WO | 2010052602 | 5/2010 |
| WO | 2017216132 | 12/2017 |

OTHER PUBLICATIONS

European Office Action in related EP Application No. EP22181949 dated Dec. 6, 2022, 6 pages.

* cited by examiner

*Primary Examiner* — Matthew P Travers
(74) *Attorney, Agent, or Firm* — Andrew M. Calderon; Calderon Safran & Cole, PC

(57) ABSTRACT

The description relates to a joining head for fastening a fastening element by a die to the surface of a component with a gripper that can be linearly displaced in a first displacement direction $R_G$ and a magazine that can be linearly displaced in a second displacement direction $R_M$. The magazine contains a plurality of fastening elements, with the first displacement direction $R_G$ running transversely to the second displacement direction $R_M$.

8 Claims, 7 Drawing Sheets

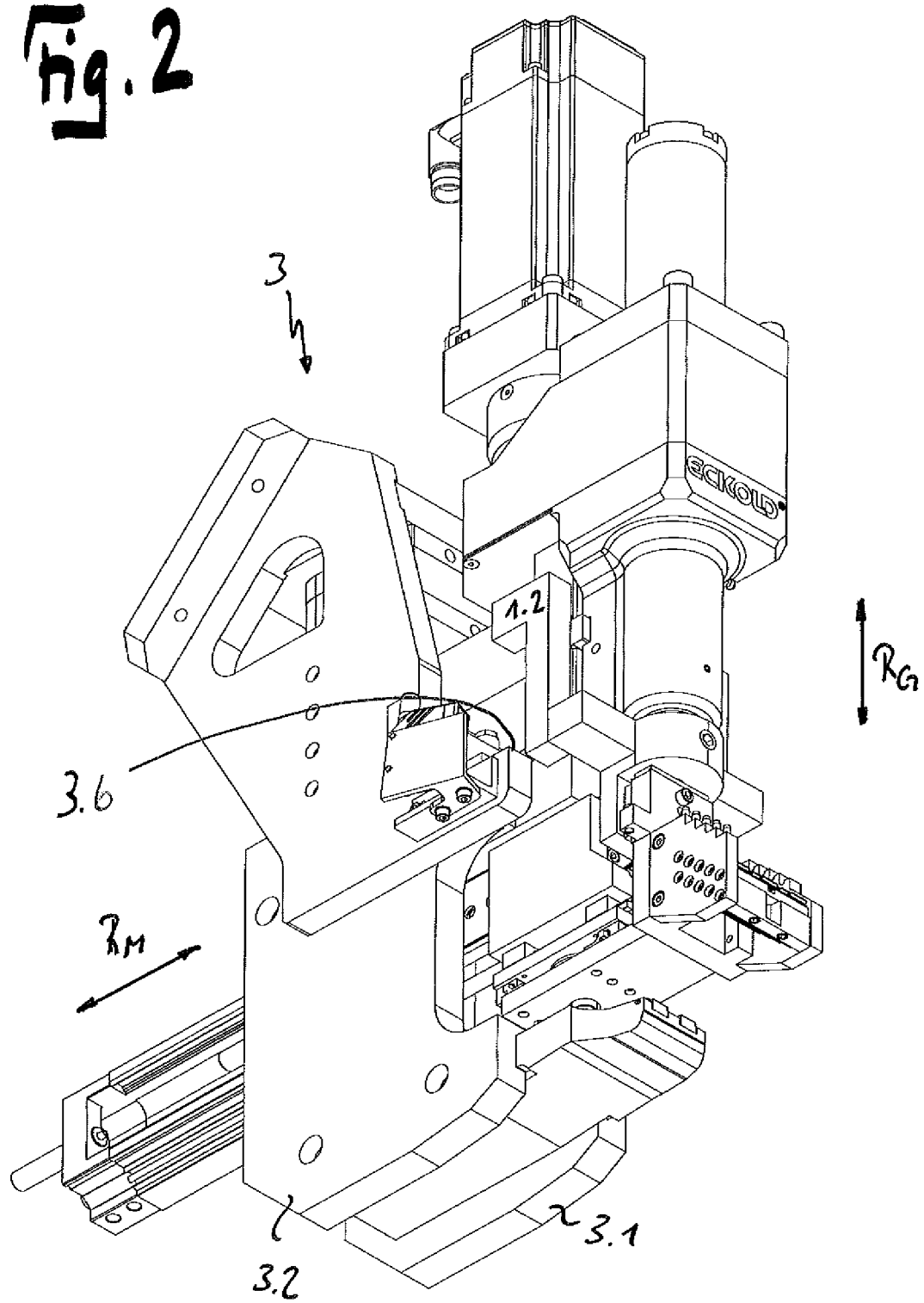

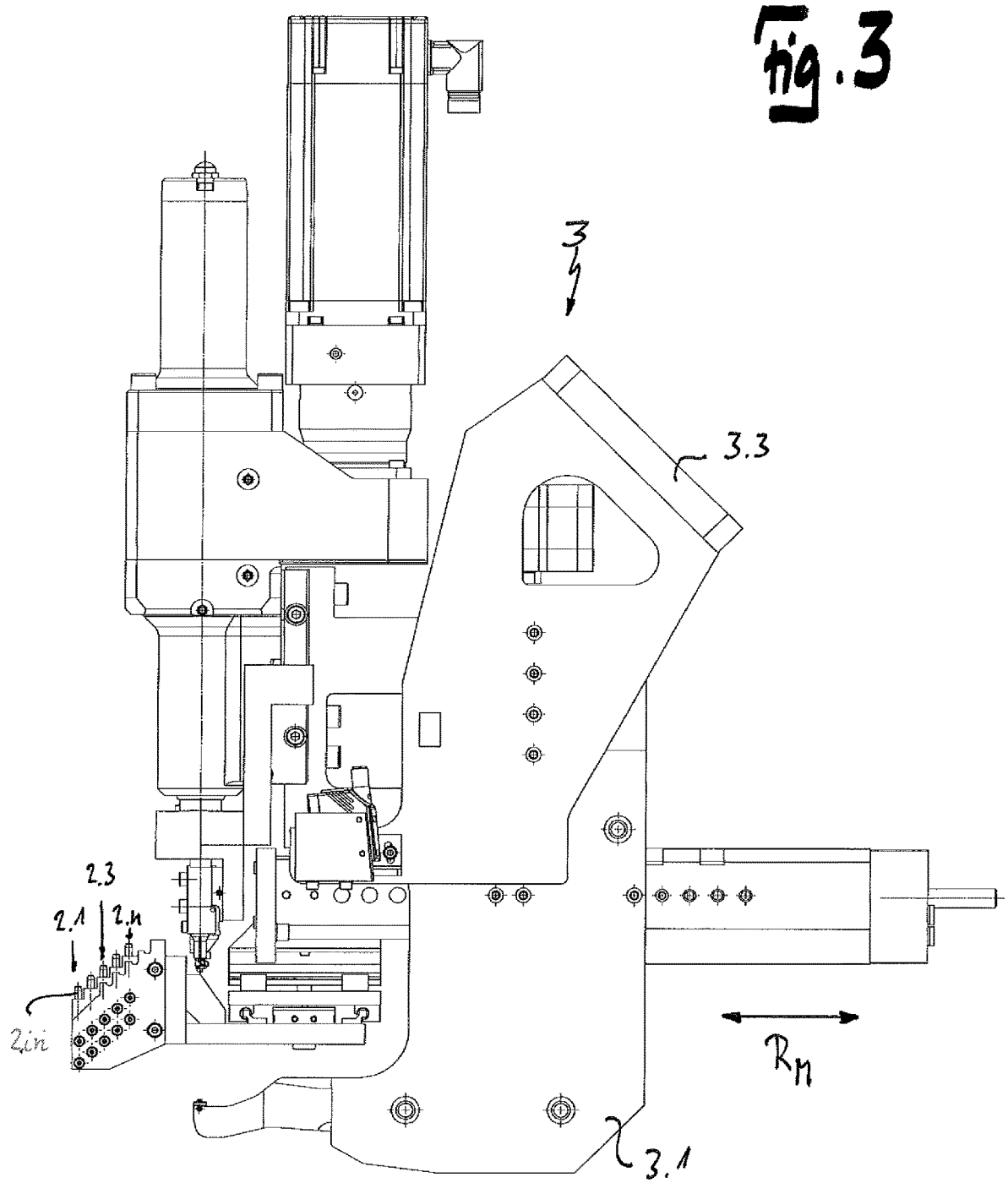

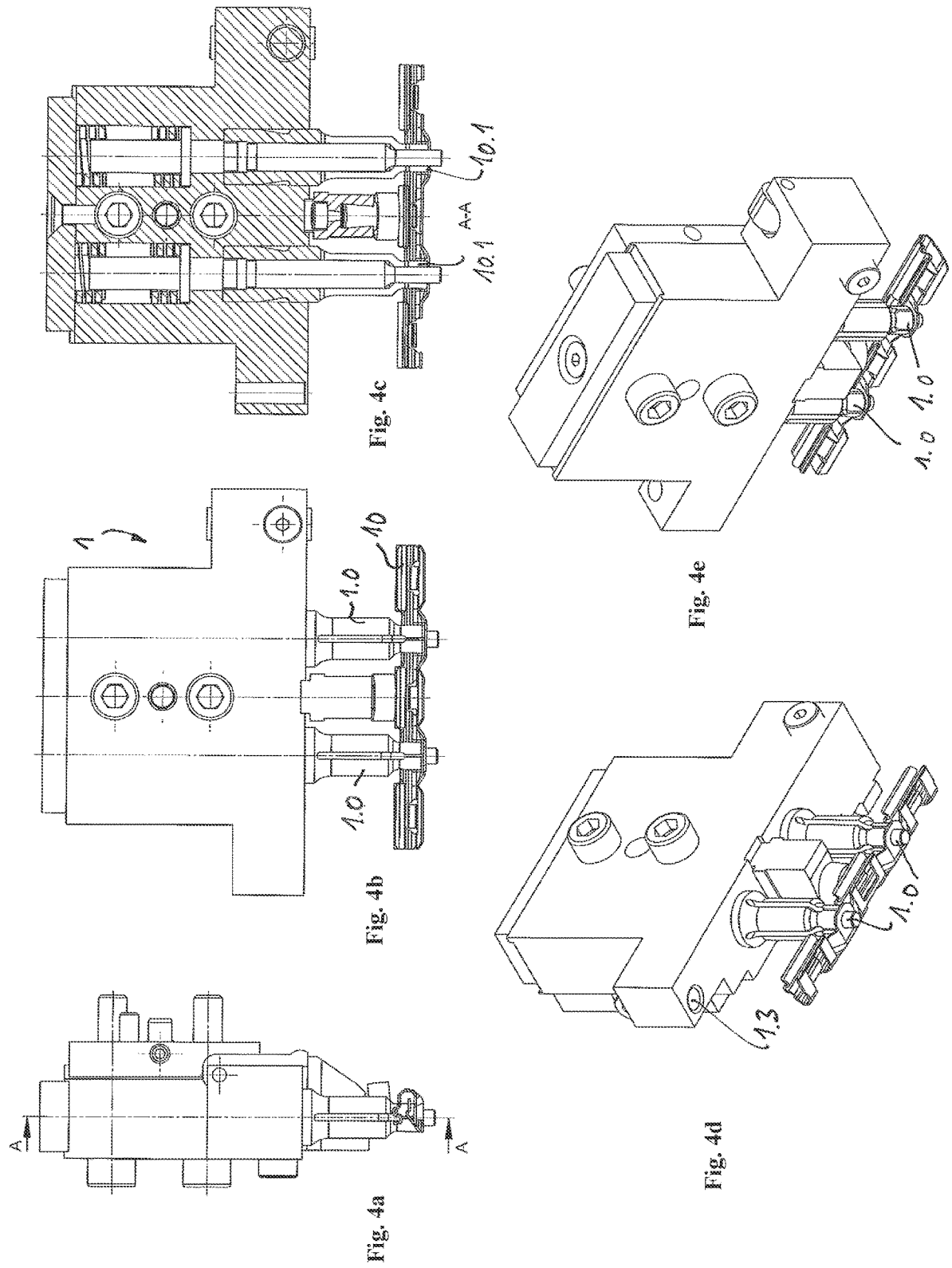

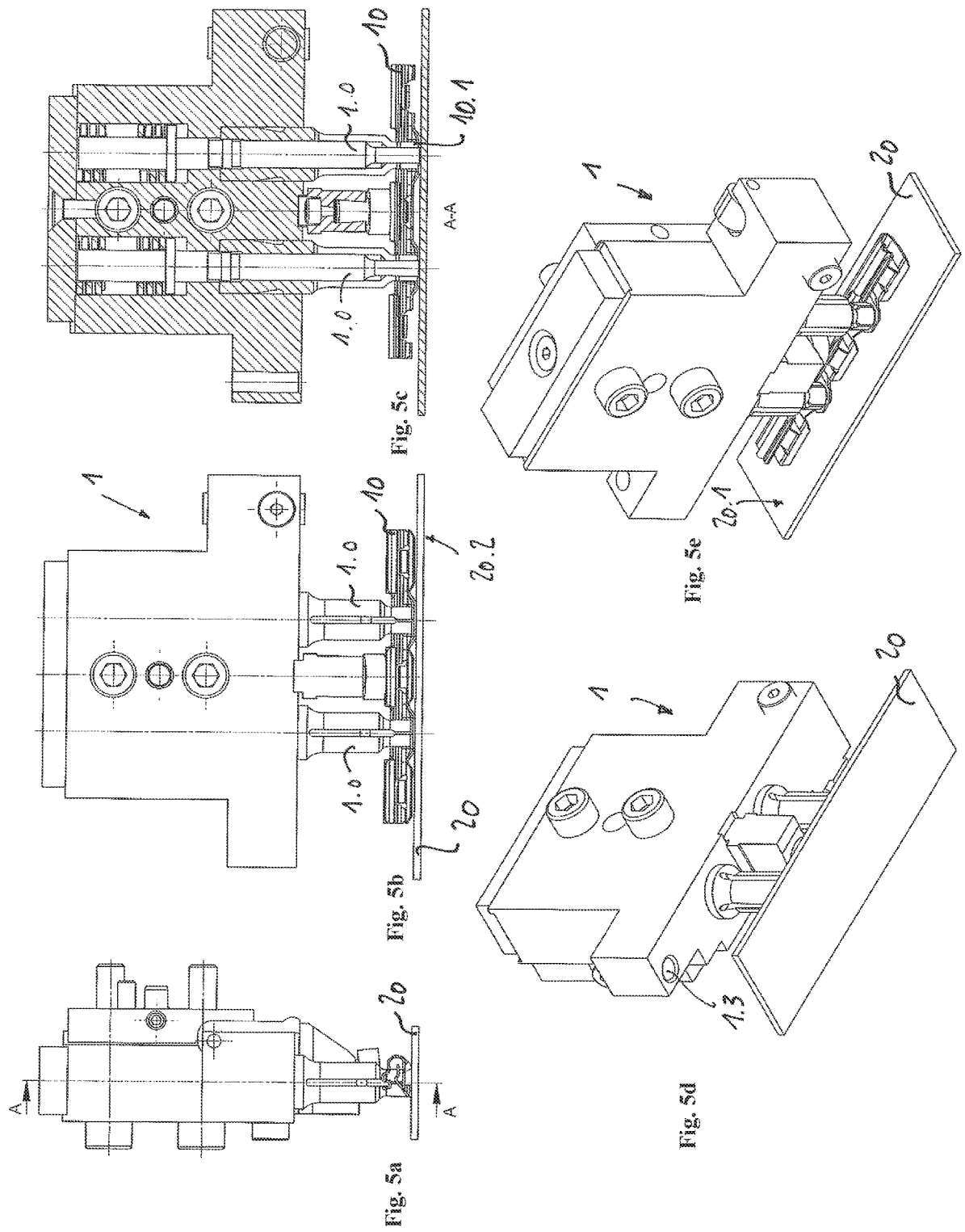

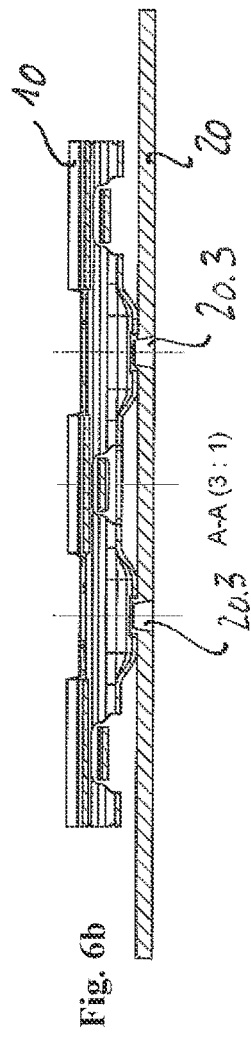
Fig. 6a
Fig. 6b
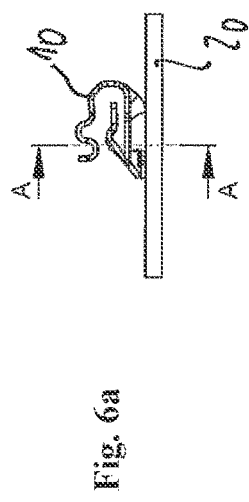
Fig. 6c
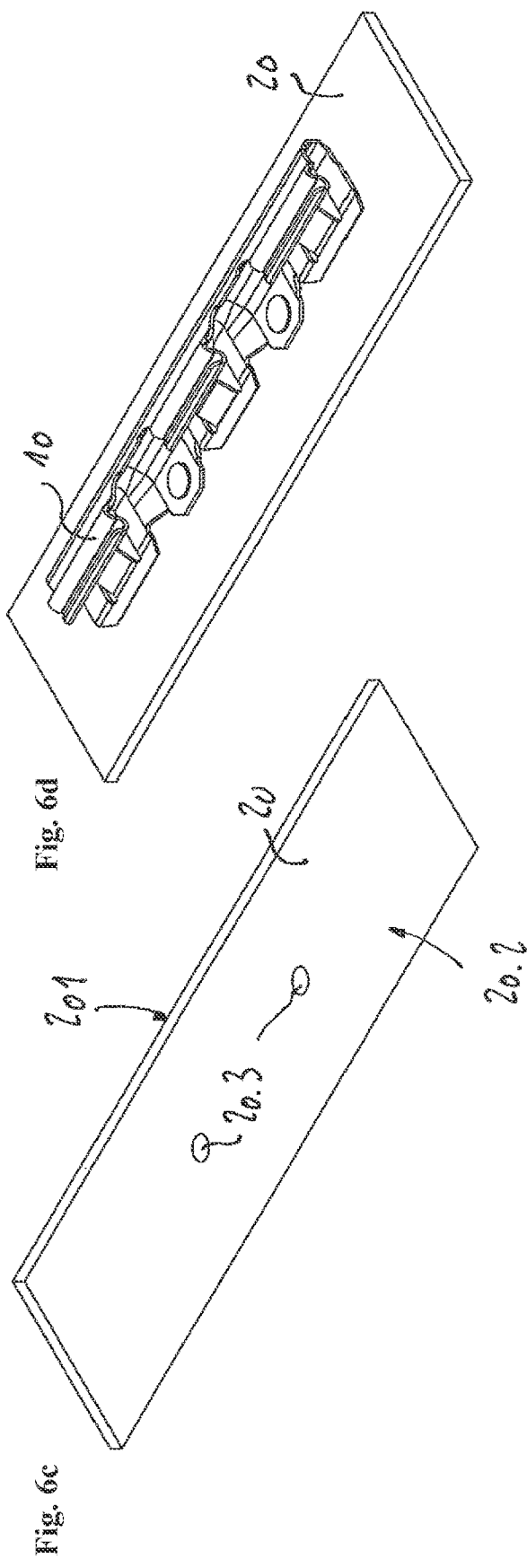
Fig. 6d

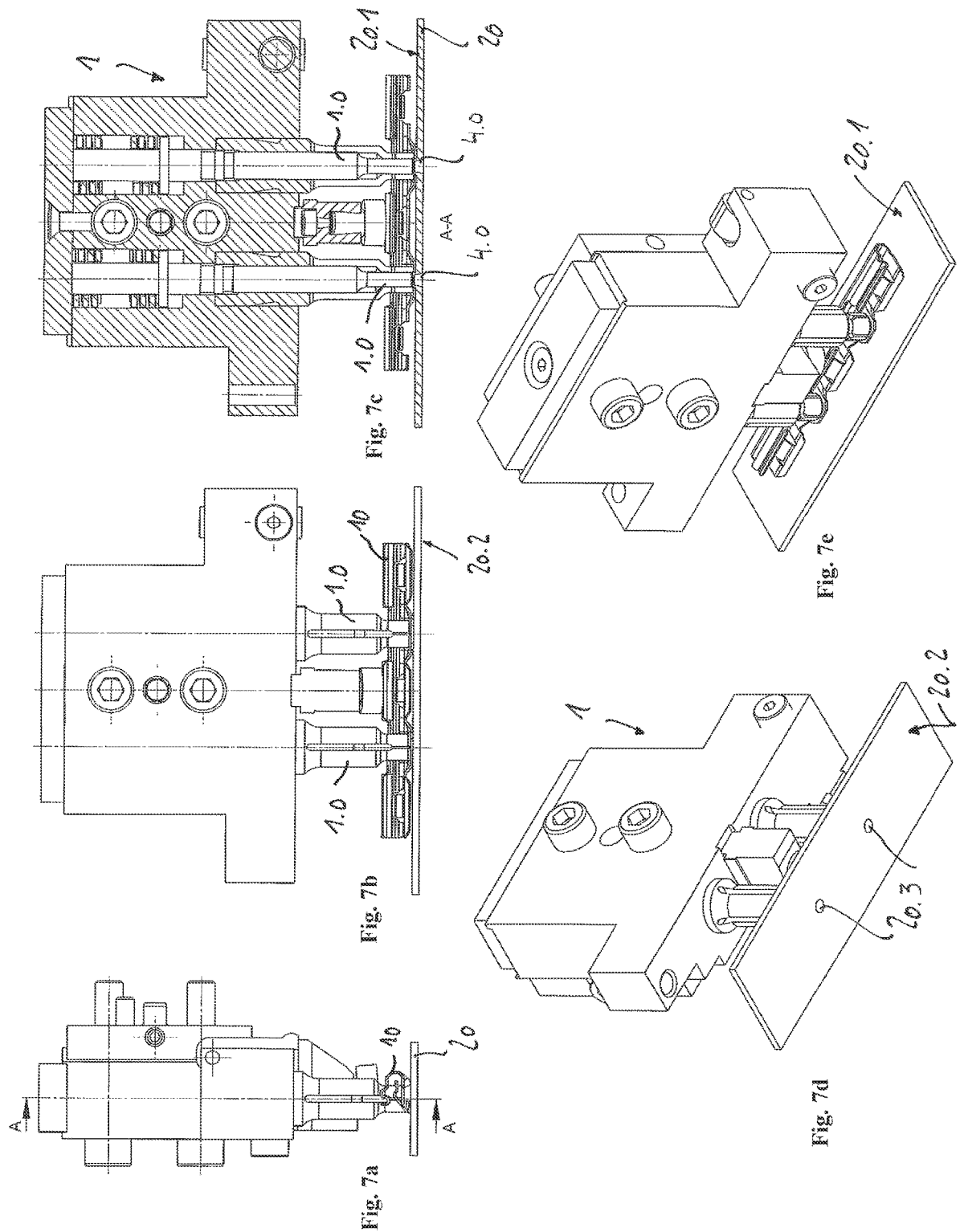

JOINING HEAD FOR FASTENING A FASTENING ELEMENT TO THE SURFACE OF A COMPONENT

FIELD OF INVENTION

The invention relates to a joining head for fastening a fastening element by means of a die on the surface of a component with a gripper that can be linearly displaced in a first displacement direction and a magazine that can be linearly displaced in a second displacement direction and contains a plurality of fastening elements.

BACKGROUND

Such a joining head is known, for example, from DE 10 2011 009 259 A1. It describes fastening elements that are connected to a workpiece and used to hold structural and functional parts. The joining head can be connected to a robot, so that a fastening element can be automatically placed on a workpiece surface and fastened there. A gripper is provided for this purpose, with which the fastening element can be removed from the magazine via a pivoting movement and aligned in a joining direction. The gripper is then used to place the fastening element on the surface of the workpiece, where it is adhesively fastened.

The design of the gripper is complex due to the pivoting capability required to grip a fastening element and the linear displacement capability required to support the fastening element on the top surface of the workpiece. The invention thus aims to simplify the construction of the joining head.

SUMMARY

To solve the problem, a joining head according to the preamble is characterized by the fact that the first displacement direction runs transversely to the second displacement direction. This design allows the magazine to be pushed under the gripper, which can move towards the magazine in its joining direction, grip a fastening element and move back against the joining direction. The magazine can then be retracted and the gripper can again move towards the component in its joining direction and place the fastening element on the surface of the component.

If the gripper is designed as at least one die, the component can be fastened by clinching. The at least one anvil required for this must then of course be in contact with the component on the opposite side. Preferably two die and two anvils are provided.

The first displacement direction (joining direction of the die) preferably extends at an angle of 90° to the second displacement direction.

If the magazine has several tiers on its side facing the gripper and each tier accommodates a fastening element, it may also be possible to remove several fastening elements from the magazine at the same time.

Preferably, between two and ten tiers are provided.

If the joining head consists of an essentially C-shaped base body with two longitudinal legs arranged parallel to each other, the magazine can be arranged between the two longitudinal legs.

The magazine can preferably be displaced in the second displacement direction to such an extent that it can be guided past the gripper. This design makes it possible to fill the gripper with fresh fastening elements in the position next to the gripper away from the joining head.

If the component is part of a motor vehicle body, for example, the fastening element can be used to fasten a trim strip, for example.

The magazine can be moved by electric motor or pneumatically. The fastening elements can preferably be held in the magazine and/or the die or the gripper by a magnetic force or by a vacuum, thereby ensuring that they cannot fall out of the holders when the magazine is fed and the joining head is moved.

The tiers can have upward-facing locating pins that engage in complementary holes in the fastening elements. This design ensures that the fastening elements are immovably positioned in the magazine and can thus be reliably gripped by the gripper.

BREIF DESCRIPTION OF DRAWINGS

In the following, an example of an embodiment of the invention will be explained in more detail with the aid of a drawing: They show:

FIG. 2 shows a perspective view of the joining head in a second position of the magazine;

FIG. 3 shows a view according to FIG. 1 in a third position of the magazine;

FIG. 4a shows a side view of a detail of the joining head;

FIG. 4b shows a view of the detail according to FIG. 4a;

FIG. 4c shows a cut along the line A-A according to FIG. 4a;

FIG. 4d shows a perspective view of the detail according to FIG. 4a;

FIG. 4e shows another perspective view of the detail according to FIG. 4a;

FIG. 5a shows a side view of a detail of the joining head before clinching;

FIG. 5b shows a view of the detail according to FIG. 5a;

FIG. 5c shows a cut along the line A-A according to FIG. 5a;

FIG. 5d shows a perspective view of the detail according to FIG. 5a;

FIG. 5e shows another perspective view of the detail according to FIG. 5a;

FIG. 6a shows a component with the fastening element;

FIG. 6b shows a cut along the line A-A according to FIG. 6a;

FIG. 6c shows a perspective view of the detail according to FIG. 6a;

FIG. 6d shows another perspective view of the detail according to FIG. 6a;

FIG. 7a shows a side view of a detail of the joining head after clinching;

FIG. 7b shows a view of the detail according to FIG. 7a;

FIG. 7c shows a cut along the line A-A according to FIG. 7a;

FIG. 7d shows a perspective view of the detail according to FIG. 7a; and

FIG. 7e shows another perspective view of the detail according to FIG. 7a.

DETAILED DESCRIPTION

Figure 1:
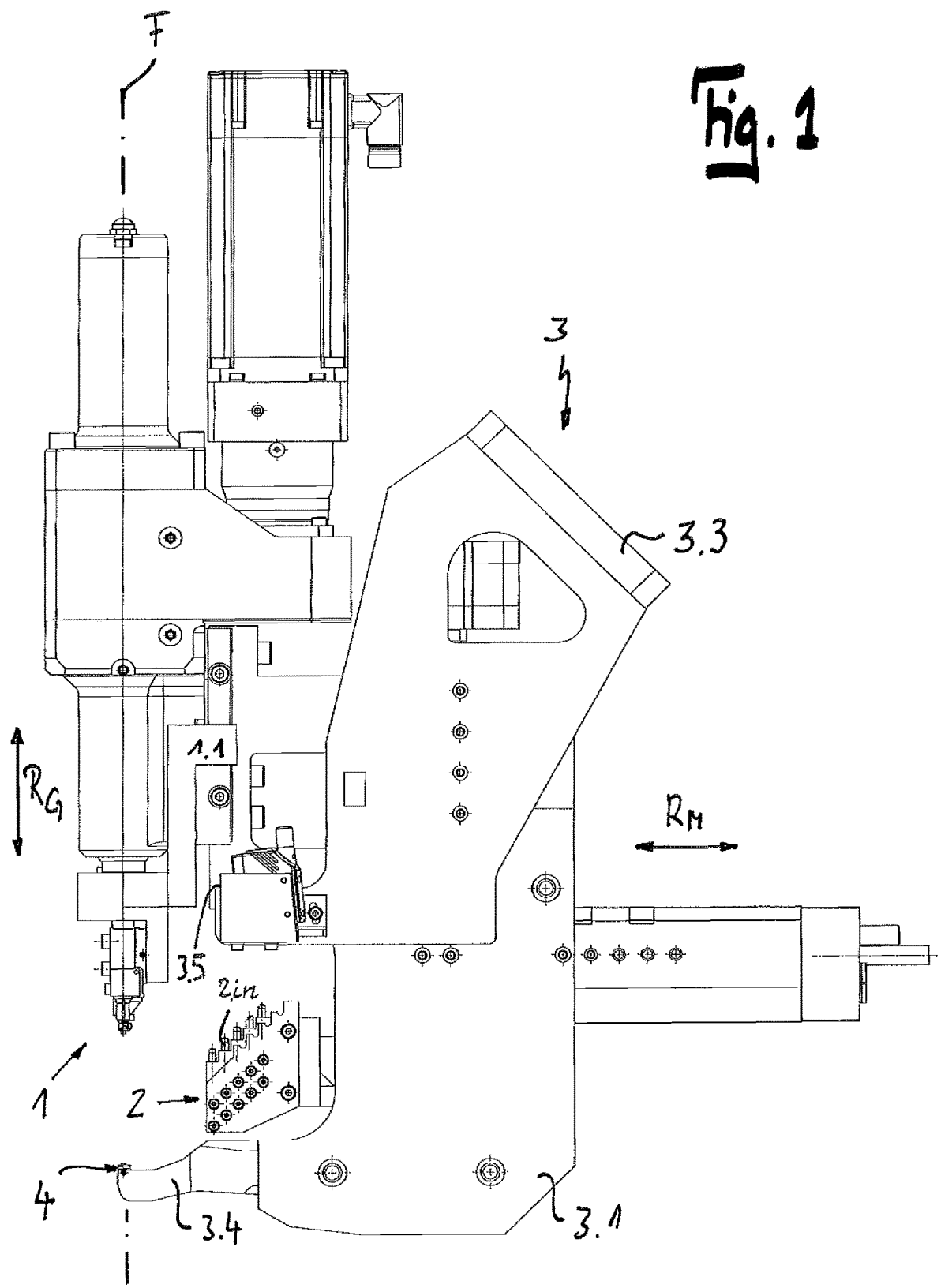
FIG. 1 shows a side view of the joining head in a first position of the magazine.

The joining head has a multi-part design and essentially consists of the C-shaped bracket 3, which has two longitudinal legs 3.1, 3.2 running parallel to each other and—as shown in the drawing—is open at the bottom. The magazine 2 is arranged between the two longitudinal legs 3.1, 3.2 such that it can be displaced in the direction $R_M$. The displacement can be done by electric motor, for example by means of an incremental motor, or pneumatically. The gripper 1, designed as a die, is also fastened to the bracket 3, wherein said gripper which can be moved linearly by electric motor in the vertical direction $R_G$ shown in the drawing. The joining head can be attached to a robot arm via a connecting plate 3.3. Opposite the die 1, concentric to the joining axis F, a punch 4 is attached to a horn 3.4 formed at the lower end of the longitudinal legs 3.1, 3.2. Two end stops 1.1, 1.2 are provided on the holder of the die/gripper 1, which is not described in more detail here, said end stops interacting with counter-stops 3.5, 3.6 on the longitudinal legs 3.1, 3.2.

As shown in FIGS. 4a to 7e, the gripper/the die 1 is designed with two gripper/die elements 1.0, which can be deemed a further example of an embodiment. Where reference is made in the following to the gripper/die 1 or punch 4, this can also be understood to include two die elements 1.0 and correspondingly two punch elements 4.0 (see FIGS. 7a-7e).

The upper side of the magazine 2 facing the gripper 1 is designed with a plurality of tiers 2.1, 2.2, 2.3, . . . , 2.n. Preferably two to ten tiers 2.n are provided. The tiers 2.n are provided with upwardly projecting receiving pins 2.in. The fastening elements 10 have holes or bores 10.3 formed congruently with the circumference of the receiving pins 2.in, so that the fastening elements 10 can be positioned on two receiving pins 2.in, via the holes 10.3. As a result, they assume a defined position and the gripper 1 or the die 1 can securely grip the fastening elements 10. In order to securely hold the fastening elements 10 received by the gripper 1, they can be tightened by means of magnetic force or pneumatically. Tightening by means of magnetic force naturally requires the fastening elements 10 to be made of a magnetic material.

FIGS. 4a-4e show a representation of a die 1 with the two die elements 1.0 arranged parallel to each other, which have gripped a fastening element 10 and removed it from the magazine 2. This embodiment is preferably used when the fastening element 10 is joined to the component 20 by means of clinching.

In the following, the mode of operation of the joining head during clinching will be briefly explained:

In order to remove one or more fastening elements 1 from the magazine 2, the latter is displaced in the direction $R_M$ to such an extent that the gripper 1 lies exactly above the fastening element or elements 10 to be removed (joining direction F). The gripper 1 is then moved downwards in the direction $R_G$ towards the magazine 2 and one or more fastening elements 10 are magnetically or pneumatically released from the magazine 2 and magnetically or pneumatically attracted by the gripper 1 (FIG. 2). To ensure that the gripper 1 and the magazine 2 are precisely aligned with each other when the fastening elements 10 are transferred, a positioning bore 1.3 is provided on the underside of the gripper 1, into which a positioning pin on the magazine 2, which is not shown, is inserted. The magazine 2 is then moved back in the opposite direction $R_M$, and the path in joining direction F for the gripper 1 or the die 1 is clear. Together with the fastening element 10, the die 1 is moved downwards in the direction $R_G$ and the fastening element 10 is placed on the upper side 20.1 of the workpiece 20 (FIGS. 5a-5e). As the die 1 is moved further in the $R_G$ direction, the stops 1.1, 1.2 come into contact with the counter-stops 3.5, 3.6, and as the movement continues, the downward movement of the die 1 pulls the longitudinal legs 3.1, 3.2 upward so that the punch 4 comes into contact with the bottom surface 20.2 of the component 20 and clinching occurs. The component 10 is then firmly connected to the component 20. FIGS. 6c and 7d show the indentations 20.3 formed by the punch elements 4.0 during clinching on the underside 20.2 of the component 20. Once all the fastening elements 10 have been removed from the magazine 2, the magazine 2 is moved to the position shown in FIG. 3 in the direction $R_M$ so that the receptacles, which run congruent to the tiers 2.n, can be refilled and the respective tiers 2.1, 2.2, 2.3, 2.n are freely accessible from above. The removal and clinching can then start again as described above.

As a rule, only a single fastening element 10 is ever removed from the magazine 2 and connected to the component 20. By means of an appropriate design of the gripper or the die 1, it is also possible to remove several fastening elements 10 simultaneously and to fasten them to a component 20. It is also conceivable that each gripper/die element 1.0 removes a separate component and these are then simultaneously connected to the component 20 by means of clinching.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A joining head for fastening a fastening element to a surface of a component with a gripper that can be linearly displaced in a first displacement direction $R_G$ and a magazine that can be linearly displaced in a second displacement direction $R_M$, the magazine containing a plurality of fastening elements wherein the first displacement direction $R_G$ runs transversely to the second displacement direction $R_M$, wherein
   the magazine features multiple tiers on a side facing towards the gripper and each tier receives one fastening element, and
   the tiers have upwardly pointing receiving pins which engage in correspondingly shaped holes in the fastening elements.

2. The joining head according to claim 1, wherein the gripper is designed as at least one die.

3. The joining head according to claim 1, wherein the first displacement direction $R_G$ extends at an angle of 90° to the second displacement direction $R_M$.

4. The joining head according to claim 1, wherein at least two and at most ten tiers are provided.

5. The joining head according to claim 1, wherein the joining head comprises a C-shaped base body with two longitudinal legs arranged parallel to each other and the magazine is arranged between the two longitudinal legs.

6. The joining head according to claim 1, wherein the magazine can be displaced in the second displacement direction $R_M$ to such an extent that it can be guided past the gripper.

7. The joining head according to claim 1, wherein the displacement of the magazine is achieved by electric motor or pneumatically.

8. The joining head according to claim 1, wherein the fastening elements can be held in the magazine and/or the gripper via a magnetic force or via a vacuum.

\* \* \* \* \*